United States Patent
Hsu et al.

(10) Patent No.: US 11,455,241 B2
(45) Date of Patent: *Sep. 27, 2022

(54) DATA MANAGEMENT METHOD APPLICABLE TO DATA STORAGE DEVICE

(71) Applicant: Silicon Motion, Inc., Jhubei (TW)

(72) Inventors: Hong-Jung Hsu, Jhubei (TW); Huang-Hsing Wu, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 29 days.

This patent is subject to a terminal disclaimer.

(21) Appl. No.: 16/822,032

(22) Filed: Mar. 18, 2020

(65) Prior Publication Data

US 2020/0218650 A1 Jul. 9, 2020

Related U.S. Application Data

(63) Continuation of application No. 15/785,264, filed on Oct. 16, 2017, now Pat. No. 10,678,685.

(30) Foreign Application Priority Data

Nov. 15, 2016 (TW) .................................. 105137285

(51) Int. Cl.
*G06F 12/02* (2006.01)
*G06F 12/1009* (2016.01)
(Continued)

(52) U.S. Cl.
CPC ...... *G06F 12/0246* (2013.01); *G06F 12/0638* (2013.01); *G06F 12/1009* (2013.01); *G06F 12/0868* (2013.01); *G06F 12/0897* (2013.01); *G06F 2212/1016* (2013.01); *G06F 2212/1044* (2013.01); *G06F 2212/205* (2013.01); *G06F 2212/222* (2013.01); *G06F 2212/225* (2013.01); *G06F 2212/313* (2013.01); *G06F 2212/466* (2013.01); *G06F 2212/65* (2013.01); *G06F 2212/70* (2013.01); *G06F 2212/7201* (2013.01); *G06F 2212/7202* (2013.01); *G06F 2212/7204* (2013.01)

(58) Field of Classification Search
CPC ............ G06F 12/0246; G06F 12/1009; G06F 12/0636; G06F 12/0868; G06F 12/0897; G06F 12/0238; G06F 12/0292; G06F 2212/7204; G06F 2212/313; G06F 2212/7202; G06F 2212/222; G06F 2212/225; G06F 2212/466; G06F 2212/1016; G06F 2212/205; G06F 2212/70; G06F 2212/7201; G06F 2212/1044; G06F 2212/65

See application file for complete search history.

(56) References Cited

U.S. PATENT DOCUMENTS

| | | | | |
|---|---|---|---|---|
| 7,587,752 | B2 * | 9/2009 | Nagaraj | H04L 12/66 380/270 |
| 8,386,717 | B1 * | 2/2013 | Banerjee | G06F 12/123 711/136 |
| 2014/0281286 | A1 * | 9/2014 | Lim | G06F 12/145 711/152 |

* cited by examiner

Primary Examiner — Hiep T Nguyen

(57) ABSTRACT

A memory management method applicable to a data storage device is provided. The memory management method includes steps of: requesting a private memory space from a host; recording a reserved memory space given by the host; dividing a mapping table into a plurality of sub-mapping tables; determining whether a capacity of the reserved memory space is sufficient to store the sub-mapping tables; and if yes, uploading the sub-mapping tables to the reserved memory space via an interface logic.

17 Claims, 4 Drawing Sheets

(51) Int. Cl.
*G06F 12/06* (2006.01)
*G06F 12/0868* (2016.01)
*G06F 12/0897* (2016.01)

| start point of memory address | end point of memory address | memory capacity |
|---|---|---|
| 0x100,0000 | 0x17F,FFFF | 8MB |
| 0x200,0000 | 0x27F,FFFF | 8MB |
| 0x300,0000 | 0x3FF,FFFF | 16MB |
| 0x500,0000 | 0x5FF,FFFF | 16MB |
| 0x800,0000 | 0x8FF,FFFF | 16MB |

| start point of memory address | sub-H2F table | read count | memory space |
|---|---|---|---|
| 0x100,0000 | #1000 | 10 | dynamic |
| 0x100,0040 | #1001 | 50 | dynamic |
| 0x100,0080 | #1002 | 100 | dynamic |
| ... | ... | ... | dynamic |
| 0x200,0000 | #0 | FF | static |
| 0x200,0040 | #1 | FF | static |
| 0x200,0080 | #2 | FF | static |
| ... | ... | ... | static |
| 0x300,0000 | #125 | FF | static |
| ... | ... | ... | static |
| 0x500,0000 | #375 | FF | static |
| ... | ... | ... | static |
| 0x800,0000 | #625 | FF | static |
| ... | ... | ... | static |

DATA MANAGEMENT METHOD APPLICABLE TO DATA STORAGE DEVICE

FIELD OF THE INVENTION

The present invention relates to a technique for data storage, and more particularly to a memory management method applicable to a data storage device.

BACKGROUND OF THE INVENTION

In general, a data storage device includes a plurality of electronic components such as a control unit, a flash memory and a dynamic random access memory (DRAM), and such data storage devices have been widely used in a variety of data storage applications. While a data storage device provided with a DRAM has higher performance, it comes with higher hardware cost. In order to reduce costs, some data storage device manufacturers do not employ DRAM, but only use built-in static random access memory (SRAM) in the control unit as a data buffer.

However, since the capacity of the static random access memory built in the control unit is small, the performance of the data storage device is poor. Therefore, how to solve such problem has been a very important issue.

SUMMARY OF THE INVENTION

One objective of the present invention is to provide a memory management method applicable to a data storage device with improved performance without employing dynamic random access memory.

The present invention provides a memory management method applicable to a data storage device, which includes steps of: requesting a private memory space from a host; recording a reserved memory space given by the host; dividing a mapping table into a plurality of sub-mapping tables; determining whether a capacity of the reserved memory space is sufficient to store the sub-mapping tables; and if yes, uploading the sub-mapping tables to the reserved memory space via an interface logic.

The present invention further provides a memory management method applicable to a data storage device, which includes steps of: requesting a private memory space from a host; recording a reserved memory space given by the host; dividing a mapping table into a plurality of sub-mapping tables; determining whether a capacity of the reserved memory space is sufficient to store the sub-mapping tables; and if no, dividing the reserved memory space into a dynamic memory space and a static memory space, and uploading a part of the sub-mapping tables to the static memory space via an interface logic.

The present invention still further provides a memory management method applicable to a data storage device, which includes steps of: requesting a private memory space from a host; recording a reserved memory space given by the host; dividing a mapping table into a plurality of sub-mapping tables; determining whether a capacity of the reserved memory space is sufficient to store the sub-mapping tables; and if yes, uploading the sub-mapping tables to the reserved memory space via an interface logic; or if no, dividing the reserved memory space into a dynamic memory space and a static memory space, and uploading a part of the sub-mapping tables to the static memory space via the interface logic.

In summary, since a memory space is acquired from a host, by using the memory space as a memory buffer for a data storage device and allowing the memory space to maintain in a specific manner the stored sub-mapping tables to have relatively high read counts, the present invention can improve the performance of data storage devices that do not employ dynamic random access memory.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
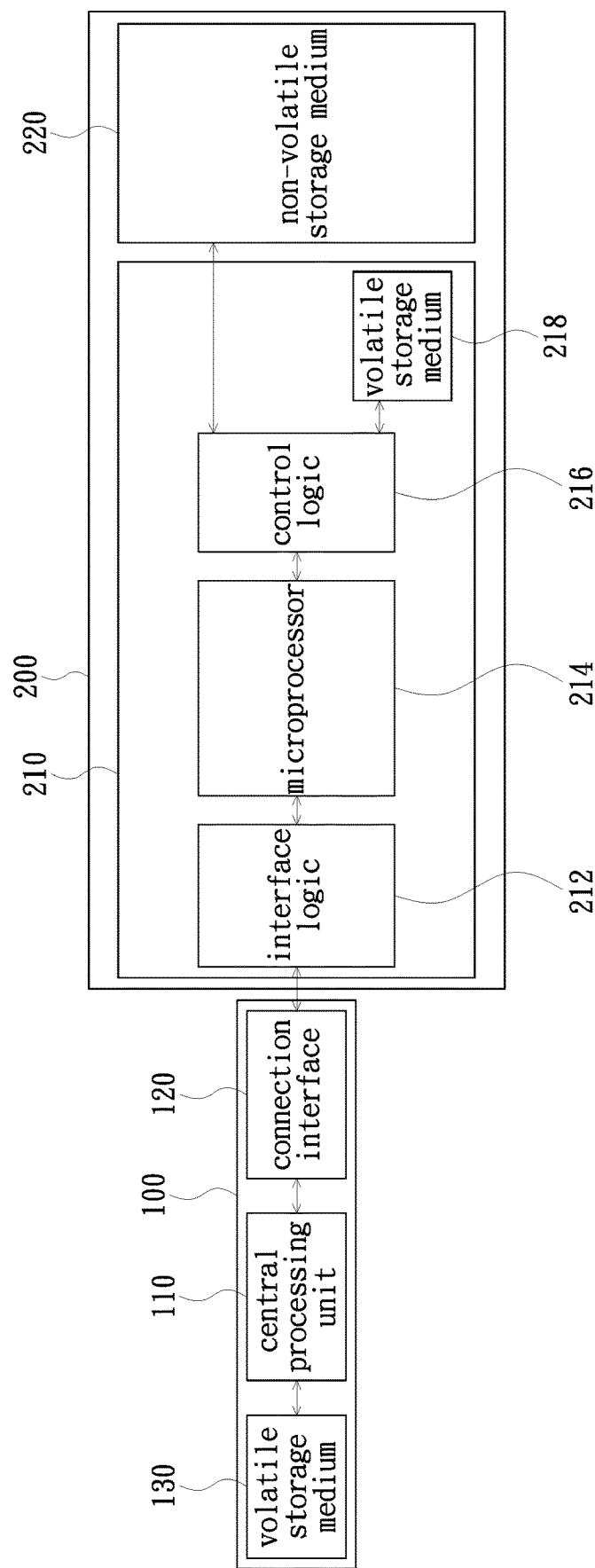
FIG. 1 depicts a data storage device in accordance with an embodiment of the present invention and its electrical coupling relationship with a host.

FIG. 1 depicts a data storage device in accordance with an embodiment of the present invention and its electrical coupling relationship with a host. Referring to FIG. 1, the host 100 mainly includes a central processing unit 110, a connection interface 120 and a volatile storage medium 130. The volatile storage medium 130 is implemented, for example, by dynamic random access memory. The connection interface 120 is adapted to electrically couple the data storage device 200 of the present embodiment. The central processing unit 110 is electrically coupled to the connection interface 120 and the volatile storage medium 130 and is configured to transmit commands and data to the data storage device 200 via the connection interface 120. For example, the central processing unit 110 transmits a read command to the data storage device 200, or transmits a write command and data to be written into the data storage device 200 to the data storage device 200. In the present embodiment, the host 100 is implemented by a computer, a mobile phone, a tablet computer, a camera or other handheld electronic device having computing function.

The data storage device 200 mainly includes a control unit 210 and a volatile storage medium 230. The control unit 210 is electrically coupled to the non-volatile storage medium 220 and is configured to control the operation (e.g., data access or data erase) of the non-volatile storage medium 220. In the present embodiment, the non-volatile storage medium 220 is, for example, a flash memory, a magnetoresistive random access memory (RAM), a ferroelectric RAM or a resistive RAM (RRAM) capable of long-term data storage. The control unit 210 mainly includes an interface logic 212, a microprocessor 214, a control logic 216 and a volatile storage medium 218, wherein the volatile storage medium 218 is implemented, for example, by a static random access memory (SRAM). The microprocessor 214 is electrically coupled to the interface logic 212 and the control logic 216 and is configured to access data in the non-volatile storage medium 220 and the volatile storage medium 218 via the control logic 216. Further, the microprocessor 214 is configured to receive commands or data from the host 100 via the interface logic 212, wherein the aforementioned commands are, for example, a write command, data to be written into the data storage device 200, a read command or an erase command.

Figure 2:
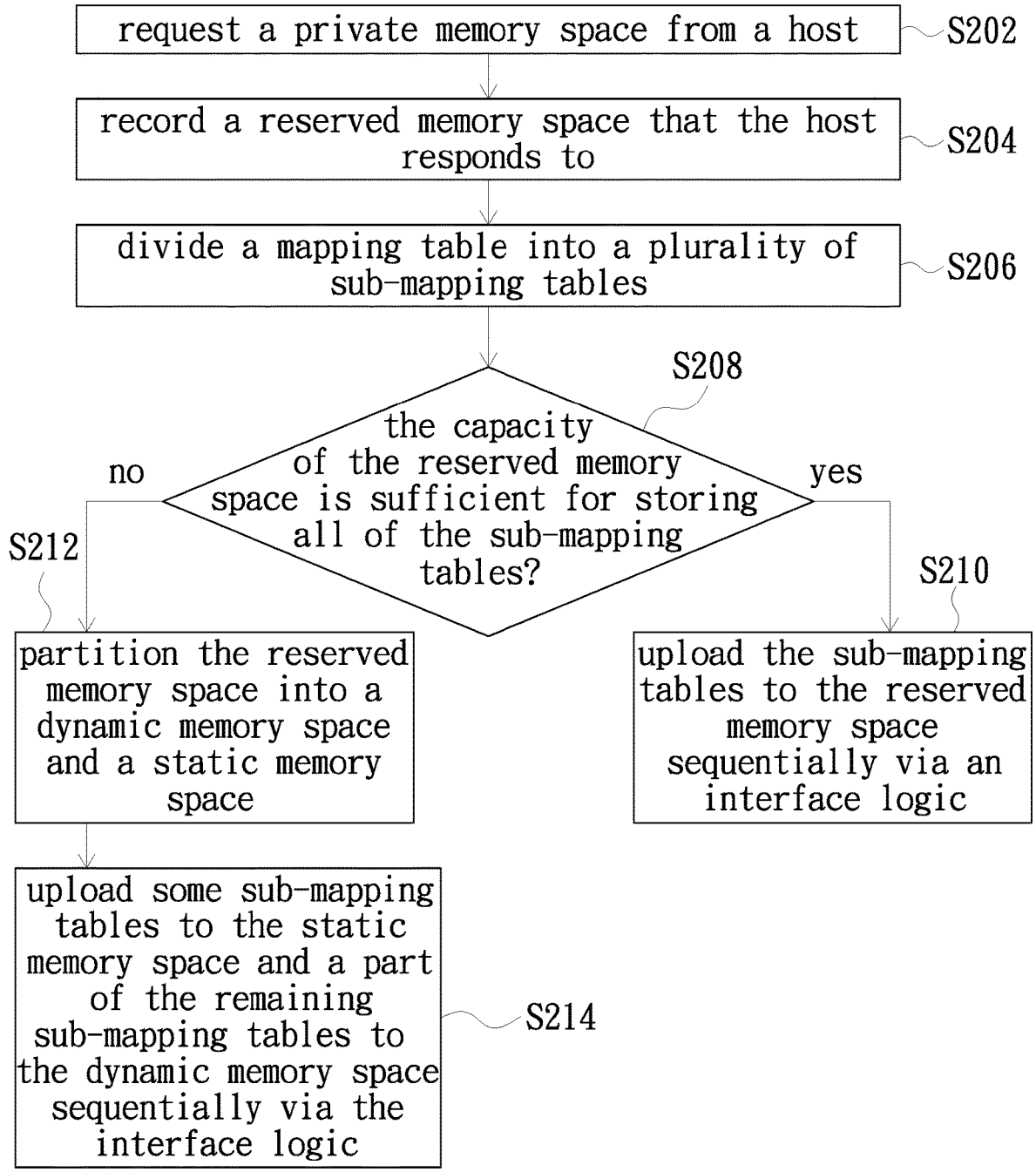
FIG. 2 is a flow chart of a memory management method applicable to a data storage device in accordance with an embodiment of the present invention.

FIG. 2 is a flow chart of a memory management method applicable to a data storage device in accordance with an embodiment of the present invention. As shown, first, step S202: requesting a private memory space from a host. Specifically, in one embodiment, after the data storage device 200 is initially electrically coupled to the host 100, the control unit 210 of the data storage device 200 communicates with the central processing unit 110, the basic input/output system (BIOS) or the unified extensible firmware interface (UEFI) of the host 100 and requires the central processing unit 110 or the UEFI to reserve a private memory space with a designated size (e.g., 64 MB) in the volatile storage medium 130 for use by the control unit 210. In another embodiment, the control unit 210 only requires the central processing unit 110, the BIOS or the UEFI to reserve a private memory space without designating the size of the private memory space.

Figures 3, 4:
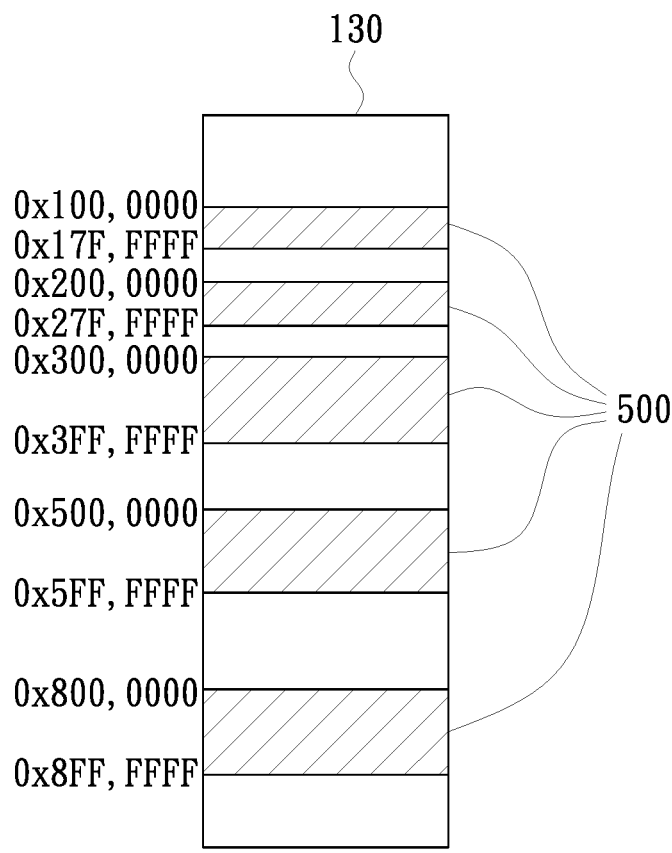
FIG. 3 is a schematic illustration of a memory space reserved on a volatile storage medium.
FIG. 4 is a table in which the control unit records the reserved memory space.

Thereafter, step S204: recording the reserved memory space that the host responds to. Specifically, the central processing unit 110, the BIOS or the UEFI of the host 100 may decline the request from the control unit 210 or may accept the request from the control unit 210 and give a reserved memory space (e.g., 64 MB). The size of the reserved memory space is equal to the size of the private memory space requested in step S202. However, the central processing unit 110, the BIOS or the UEFI may also accept the request of the control unit 210, but the size of the given reserved memory space (e.g., 48 MB) is smaller than the size of the private memory space requested in step S202. When the reserved memory space is given, the control unit 210 is able to utilize the memory space by itself, for example, to utilize the reserved memory space as a data buffer or a memory of the control unit 210. The reserved memory space is preferably represented by one or more groups of physical address start and end points, such as 0x100,0000 and 0x17F,FFFF, which represent that the reserved memory space 500 has 8 MB and that 0x indicates a hexadecimal value. The reserved memory space 500 may also be represented by the physical address start point and the memory capacity, such as 0x100,0000 and 8 MB. FIG. 3 is a schematic diagram of the reserved memory space 500 in the volatile storage medium 130. The five areas indicated by oblique lines are the reserved memory spaces 500 in the volatile storage medium 130. Each area is represented by a group of physical addresses start and end points. Because the reserved memory space is determined by the central processing unit 110 or the UEFI, the reserved memory space 500 may be one area with continuous physical addresses in the volatile storage medium 130 or may be a plurality of separated areas with discontinuous physical addresses.

FIG. 4 is a table in which the control unit 210 records the reserved memory space 500; that is, the table shown in FIG. 4 records the reserved memory space 500 shown in FIG. 3. As shown, the first area has a memory address start point 0x100,0000, a memory address end point 0x17F,FFFF and a memory capacity of 8 MB. The memory capacity of the second to fifth areas is 8 MB, 16 MB, 16 MB and 16 MB, respectively. Therefore, the total memory capacity of the reserved memory space 500 is 64 MB, which is the sum of the memory capacities of the five areas.

Thereafter, step S206: dividing a mapping table into a plurality of sub-mapping tables. Specifically, the control unit 210 generates and maintains a host logical address to flash physical address mapping table (H2F, hereinafter referred to as a mapping table) for managing the data stored in the non-volatile storage medium 220. Basically, the size of the mapping table is associated with the data capacity of the non-volatile storage medium 220. For example, the size of the mapping table is 1/1000 of the data capacity of the non-volatile storage medium 220; that is, if the data capacity of the non-volatile storage medium 220 is 128 GB, the size of the mapping table is 128 MB. The control unit 210 may divide (logically divide) the mapping tables into a predetermined number of sub-mapping tables, for example, 20 sub-mapping tables, which are sub-mapping tables #0 to #19; or the control unit 210 preferably divide the mapping table in accordance with a default size (e.g., 64 KB).

Thereafter, step S208: determining whether the capacity of the reserved memory space 500 is sufficient for storing all of the sub-mapping tables. If yes, step S210 is performed. If not, step S212 is performed. Assuming that the data capacity of the non-volatile storage medium 220 is 64 GB. Since the reserved memory space 500 is 64 MB, the capacity of the reserved memory space 500 is just enough to store all the sub-mapping tables. On the contrary, assuming that the data capacity of the non-volatile storage medium 220 is 128 GB. Since the reserved memory space 500 is 64 MB, the capacity of the reserved memory space 500 is not sufficient to store all the sub-mapping tables.

Thereafter, step S210: uploading the sub-mapping tables to the reserved memory space sequentially via an interface logic, wherein the interface logic is in compliance with communication protocols, such as PCI Express, SATA, USB, MIPI M-PHY or MIPI D-PHY. Specifically, both of the interface logic 212 and the connection interface 120 are in compliance with communication protocols, such as PCI Express, SATA, USB, MIPI M-PHY or MIPI D-PHY. Therefore, the control unit 210 transmits data and commands with the central processing unit 110 via the interface logic 212 and the connection interface 120. For example, the control unit 210 transmits data packets to the central processing unit 110, the central processing unit 110 then extracts the sub-mapping tables from the data packets and stores the sub-mapping tables at the physical address of the designated volatile storage medium 130 sequentially. In addition, in order to reduce the load of the central processing unit 110 and increase the speed of data transmission, the control unit 210 may communicate with the built-in direct memory access (DMA) controller of the central processing unit 110. As a result, the control unit 210 may communicate with the DMA controller of the central processing unit 110 via the interface logic 212 and the connection interface 120 to upload the sub-mapping tables to the reserved memory space 500.

Figures 5, 6:
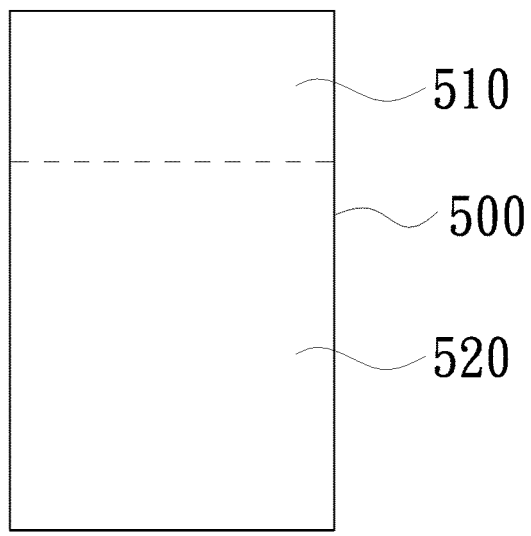
FIG. 5 depicts that the reserved memory space is divided into a dynamic memory space and a static memory space.
FIG. 6 is a look-up table according to an embodiment of the present invention.

Thereafter, step S212: partitioning the reserved memory space 500 into a dynamic memory space and a static memory space. Specifically, the size of the dynamic memory space is preferably smaller than or equal to the size of the static memory space; or the size of the static memory space is a predetermined value, for example, 40 MB; or the size of the dynamic memory space to the size of the static memory space is a fixed ratio, for example 1:1; or the sizes of the dynamic memory space and the static memory space may be adjusted according to a performance parameter. After completion of step S204, the control unit 210 knows that the capacity of the reserved memory space 500 is 64 MB, and therefore the control unit 210 partitions the reserved memory space 500 into the dynamic memory space 510 (e.g., 8 MB) and the static memory space 520 (e.g., 56 MB), as shown in FIG. 5; or, the control unit 210 defines 40 MB of the reserved memory space 500 as the static memory space 520 and the remaining 24 MB is defined as the dynamic memory space 510; or, the control unit 210 evenly divides the reserved memory space 500 into two parts, wherein both of the static memory space 520 and the dynamic memory space 510 are 32 MB.

Thereafter, step S214: uploading a plurality of sub-mapping tables to the static memory space and a part of the remaining sub-mapping tables to the dynamic memory space sequentially via the interface logic. Specifically, a part of the sub-mapping tables are first uploaded to the static memory space, and then a part of the remaining sub-mapping tables are uploaded to the dynamic memory space; or, a plurality of sub-mapping tables are first uploaded to the static memory space, and then a part of the remaining sub-mapping tables having higher read counts are uploaded to the dynamic memory space. In general, the non-volatile storage medium 220 is not filled with data. For example, the non-volatile storage medium 220 has a data capacity of 256 GB but stores only 32 GB of data. Therefore, the control unit 210 uploads the sub-mapping tables that manage the 32 GB of data to the static memory space 520. If one sub-mapping table is 64 KB and 500 sub-mapping tables (i.e. sub-mapping tables #0 to #499) are required to manage the 32 GB data, the control unit 210 uploads the 500 sub-mapping tables to the static memory space 520. Assuming that the data stored in the non-volatile storage medium 220 is increased to 64 GB and 1,000 sub-mapping tables (i.e. sub-mapping tables #0 to #999) are required to manage the 64 GB data. Since the static memory space 520 can store only 875 sub-mapping tables, the control unit 210 further uploads some sub-mapping tables (i.e., sub-mapping tables #500 to #874) to the static memory space 520, and then uploads the remaining sub-mapping tables (i.e. sub-mapping tables #875 to #999) to the dynamic memory space 510. Assuming that the data stored in the non-volatile storage medium 220 is larger than 64 GB (e.g., 128 GB) and 2,000 sub-mapping tables are required to manage the 128 GB data stored in the non-volatile storage medium 220. The control unit 210 reserves 875 sub-mapping tables (i.e., sub-mapping tables #0 to #874) stored in the static memory space 520, and uses the required sub-mapping tables (e.g., sub-mapping tables #1000 to #1100) for managing data addition, update or deletion to replace or swap the sub-mapping tables stored in the dynamic memory space 510 (e.g., sub-mapping tables #875 to #999). In other words, the sub-mapping tables stored in the static memory space 520 are not replaceable or swappable, whereas the sub-mapping tables stored in the dynamic memory space 510 are replaceable or swappable. The control unit 210 can manage data of 56 GB or less (that is, 56 GB data having a smaller LBA) more efficiently for that there is no need to perform the step of replacing or swapping the sub-mapping tables. When the amount of data is larger than 56 GB, 56 GB of data is still managed with good efficiency; in this way, the performance of the data storage device 200 can be maintained at a good level.

In addition, when performing the step of replacing or swapping the sub-mapping tables, the control unit 210 preferably replaces or swaps the sub-mapping tables stored in the dynamic memory space 510 with those having higher read counts, thereby increasing hit rate of the sub-mapping tables in the dynamic memory space 510 while accessing data and increasing system performance of the data storage device 200.

In the memory management method applicable to a data storage device of the present invention, how to quickly and correctly find a desired sub-mapping table from the reserved memory space 500, including the dynamic memory space 510 and the static memory space 520, has a determining effect on system performance of the data storage device 200. In the present invention, the control unit 210 establishes and maintains a cache look-up table as shown in FIG. 6. The cache look-up table is preferably established based on the information recorded in FIG. 4. Assuming that the dynamic memory space 510 is 8 MB, the static memory space 520 is 56 MB, the sub-mapping table is 64 KB, and the non-volatile storage medium 220 has a data capacity of 128 GB. Therefore, the total number of sub-mapping tables is 2000, and the cache look-up table is able to store 1000 records related to the sub-mapping tables, including information such as the serial number of the sub-mapping table, the start point of physical address and the read count. Because the control unit 210 does not perform replacement or swap on the sub-mapping tables in the static memory space 520, the information regarding the read count can be ignored or replaced by an arbitrary value such as FF. Or, the control unit 210 records only the information related to the sub-mapping tables stored in the dynamic memory space 510 in the cache look-up table without recording the information related to the sub-mapping tables stored in the static memory space 520. By reading the cache look-up table, the control unit 210 is able to quickly and correctly access the sub-mapping tables from the reserved memory space 500 to access the data stored in the non-volatile storage medium 220.

In addition, the control unit 210 may also adjust the ratio of the static memory space 520 in the reserved memory space 500 in accordance with a performance parameter. The performance parameter may be associated with the size of the reserved memory space 500. For example, the smaller the reserved memory space 500, the smaller the ratio of the static memory space 520 in the reserved memory space 500. Or, the performance parameter may be associated with the actual amount of data stored in the non-volatile storage medium 220. For example, the larger the actual amount of data stored in the non-volatile storage medium 220, the smaller the ratio of the static memory space 520 in the reserved memory space 500, or, the ratio may be zero, i.e., the reserved memory space 500 is equal to the dynamic memory space 510.

In summary, since a memory space is acquired from a host, by using the memory space as a memory buffer for a data storage device and allowing the memory space to maintain in a specific manner the stored sub-mapping tables to have relatively high read counts, the present invention can improve the performance of data storage devices that do not employ dynamic random access memory.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A memory management method applicable to a data storage device, comprising:
    the data storage device requesting a private memory space from a host;
    the data storage device recording a reserved memory space given by the host;
    the data storage device dividing a mapping table into a plurality of sub-mapping tables,
    wherein a size of the mapping table is associated with a data capacity of a non-volatile storage medium;
    the data storage device determining whether a capacity of the reserved memory space is sufficient to store the sub-mapping tables; and
        if yes, the data storage device sequentially uploading the sub-mapping tables to the reserved memory space via an interface logic;
    wherein, the reserved memory space comprises a plurality of separated areas with discontinuous physical addresses in a volatile storage medium.

2. The memory management method according to claim 1, wherein the capacity of the reserved memory space is equal to or smaller than a capacity of the private memory space.

3. The memory management method according to claim 1, wherein a total number of the sub-mapping tables is a predetermined value.

4. The memory management method according to claim 1, wherein a size of each of the sub-mapping tables is a predetermined value.

5. A memory management method applicable to a data storage device, comprising:
    the data storage device requesting a private memory space from a host;
    the data storage device recording a reserved memory space given by the host;
    the data storage device dividing a mapping table into a plurality of sub-mapping tables,
    wherein a size of the mapping table is associated with a data capacity of a non-volatile storage medium;
    the data storage device determining whether a capacity of the reserved memory space is sufficient to store the sub-mapping tables; and
        if no, the data storage device partitioning the reserved memory space into a dynamic memory space and a static memory space, and the data storage device sequentially uploading a part of the sub-mapping tables to the static memory space and a part of the remaining sub-mapping tables to the dynamic memory space via an interface logic;
    wherein, the reserved memory space comprises a plurality of separated areas with discontinuous physical addresses in a volatile storage medium.

6. The memory management method according to claim 5, further comprising:
    the data storage device establishing and maintaining a cache look-up table to manage the part of the remaining sub-mapping tables that has been uploaded to the reserved memory space.

7. The memory management method according to claim 5, further comprising:
    the data storage device randomly uploading a part of the remaining sub-mapping tables to the dynamic memory space via the interface logic.

8. The memory management method according to claim 5, further comprising:
    the data storage device sequentially uploading a part of the remaining sub-mapping tables to the dynamic memory space via the interface logic according to read counts of the remaining sub-mapping tables.

9. The memory management method according to claim 5, wherein a capacity of the reserved memory space is equal to or smaller than a capacity of the private memory space.

10. The memory management method according to claim 5, wherein a size of the dynamic memory space is equal to or smaller than a size of the static memory space.

11. The memory management method according to claim 5, wherein a size of the dynamic memory space to a size of the static memory space is a fixed ratio.

12. The memory management method according to claim 5, wherein a size of the dynamic memory space and a size of the static memory space are adjusted according to a performance parameter.

13. The memory management method according to claim 12, wherein the performance parameter is associated with a size of the reserved memory space.

14. The memory management method according to claim 12,
    wherein the performance parameter is associated with the data capacity of the non-volatile storage medium.

15. The memory management method according to claim 5, wherein the capacity of the reserved memory space is equal to or smaller than a capacity of the requested private memory space.

16. The memory management method according to claim 5, wherein a total number of the sub-mapping tables is a predetermined value.

17. A memory management method applicable to a data storage device, comprising:
    the data storage device requesting a private memory space from a host;
    the data storage device recording a reserved memory space given by the host;
    the data storage device dividing a mapping table into a plurality of sub-mapping tables,
    wherein a size of the mapping table is associated with a data capacity of a non-volatile storage medium;
    the data storage device determining whether a capacity of the reserved memory space is sufficient to store the sub-mapping tables; and
    if yes, the data storage device uploading the sub-mapping tables to the reserved memory space via an interface logic; or
        if no, the data storage device dividing the reserved memory space into a dynamic memory space and a static memory space, and the data storage device sequentially uploading a part of the sub-mapping tables to the static memory space and a part of the remaining sub-mapping tables to the dynamic memory space via the interface logic;
    wherein, the reserved memory space comprises a plurality of separated areas with discontinuous physical addresses in a volatile storage medium.

* * * * *